United States Patent
Scher et al.

(10) Patent No.: US 7,149,656 B2
(45) Date of Patent: Dec. 12, 2006

(54) DIAGNOSTIC SYSTEM FOR A DATA ACQUISITION SYSTEM

(75) Inventors: Claude Scher, Milwaukee, WI (US); Jean Marc Delplanque, Menomonee Falls, WI (US); Sundar Ramakrishnan, Oak Creek, WI (US); Ram Ananthakrishnan, Franklin, WI (US)

(73) Assignee: General Electric Company, Schnectady, NY (US)

( * ) Notice: Subject to any disclaimer, the term of this patent is extended or adjusted under 35 U.S.C. 154(b) by 547 days.

(21) Appl. No.: 10/064,128

(22) Filed: Jun. 13, 2002

(65) Prior Publication Data
US 2003/0233215 A1   Dec. 18, 2003

(51) Int. Cl.
*G06F 15/00* (2006.01)
(52) U.S. Cl. .................................... 702/183; 600/425
(58) Field of Classification Search ................ 702/40, 702/81, 90, 120–124, 182–185, 46–48; 714/46–48, 714/37–39; 600/425; 250/363.03; 382/131; 707/201
See application file for complete search history.

(56) References Cited

U.S. PATENT DOCUMENTS

| | | | |
|---|---|---|---|
| 5,754,451 A * | 5/1998 | Williams | 702/185 |
| 5,807,256 A * | 9/1998 | Taguchi et al. | 600/425 |
| 6,239,438 B1 * | 5/2001 | Schubert | 250/363.03 |
| 6,298,454 B1 * | 10/2001 | Schleiss et al. | 714/37 |
| 6,345,113 B1 * | 2/2002 | Crawford et al. | 382/131 |
| 6,598,011 B1 * | 7/2003 | Howards Koritzinsky et al. | 702/185 |
| 6,656,683 B1 * | 12/2003 | Reuben et al. | 435/6 |
| 6,678,703 B1 * | 1/2004 | Rothschild et al. | 707/201 |
| 2002/0082862 A1 * | 6/2002 | Kelley et al. | 705/2 |
| 2002/0085674 A1 * | 7/2002 | Price et al. | 378/122 |
| 2002/0123864 A1 * | 9/2002 | Eryurek et al. | 702/188 |

OTHER PUBLICATIONS

Gerald E. Dallal, "look at the data", 1999, pp. 1-4.*

* cited by examiner

*Primary Examiner*—Marc S. Hoff
*Assistant Examiner*—Mohamed Charioui
(74) *Attorney, Agent, or Firm*—Peter J. Vogel

(57) ABSTRACT

A diagnostic system for a data acquisition system includes a computer controller that is coupled to the data acquisition system. A display device is coupled to the computer controller. The computer controller receives data from the data acquisition system and generates a screen display corresponding to an architectural representation of the data acquisition system. The controller generates screen indicia corresponding to a location of a problem on the architectural representation.

23 Claims, 4 Drawing Sheets

DIAGNOSTIC SYSTEM FOR A DATA ACQUISITION SYSTEM

BACKGROUND OF INVENTION

The present invention relates generally to data acquisition systems, and more particularly, to a diagnostic system for a data acquisition system.

Diagnostic systems typically are used to test the operation of the system during manufacturing and the functioning of the system in operation. Typical diagnostic systems perform tests and provide various test data. The test data is then analyzed by the technician to determine the source of the problem.

Complex systems such as computed tomography (CT) type systems include a number of controlling circuit cards. One example of the amount of data provided in such a system is that fifty critical to quality (CTQ) characteristics may be tested in a complete test. Nearly 13,000 data points per CTQ may be obtained in such systems. Sorting through such a vast amount of data is difficult. Therefore, pinpointing the source of errors is also difficult.

Therefore, it would be desirable to provide a system to easily pinpoint a problem in a complex system.

SUMMARY OF INVENTION

The present invention provides a diagnostic system for a data acquisition that may be used locally or remotely. In one aspect of the invention a diagnostic system for a data acquisition includes a computer controller that is coupled to the data acquisition system. A display device is coupled to the computer controller. The computer controller receives data from the data acquisition and generates a screen display corresponding to an architectural representation of the data acquisition system. The controller generates screen indicia corresponding to a location of a problem on the architectural representation.

In a further aspect of the invention the method for operating a data acquisition system comprises: receiving data from a data acquisition system; diagnosing a problem in response to said data; generating a screen display corresponding to an schematic representation of the data acquisition system; and generating a screen indicia on said display device corresponding to a location of a problem on the schematic representation of the data acquisition system.

One advantage of the invention is that the system may be accessed remotely. That is, the present invention may be accessed through an internet browser when the data acquisition system is coupled to a network. Such systems are particularly useful for complex systems that are not easily removed from their locations such as x-ray systems, CT systems, and MRI systems.

Other aspects and advantages of the present invention will become apparent upon the following detailed description and appended claims, and upon reference to the accompanying drawings.

DETAILED DESCRIPTION

Figure 1:
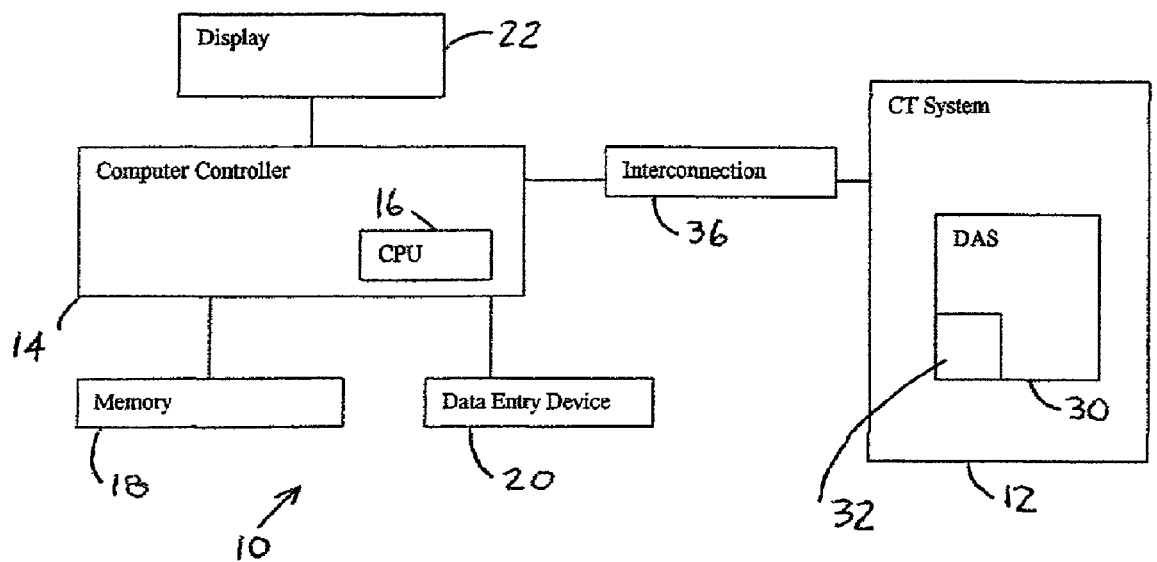
FIG. 1 is a schematic view of a system having a data acquisition system and a diagnostic device coupled thereto.

In the following figures the same reference numerals will be used to illustrate the same components. The following description is provided with respect to a computed tomography (CT) machine, however, those skilled in the art will recognize various applications for the diagnostic system described herein.

Referring now to FIG. 1, a diagnostic system 10 is illustrated coupled to a CT system 12. Diagnostic system 10 includes a computer controller 14 that is preferably microprocessor-based and thus has a CPU 16 therein. Computer controller 14 has a memory 18, a data entry device 20, and a display 22. Memory 18 may be various types of memory including RAM or ROM or hard disk, floppy disk, CD, or DVD. Data entry device 20 may be various types of data entry devices including a keyboard, touch screen, or other type of device. Display 22 is preferably a monitor and may include a flat panel or other type of monitor.

CT system 12 is illustrated as simply having a data acquisition system 30. Data acquisition system 30, of course, is one of only a number of different components within a CT system. Data acquisition 30 may also include a controller 32. In a typical configuration, various types of controllers including various numbers of processors and application-specific integrated circuits are employed. Data acquisition system 30 and computer controller 14 may be connected through an interconnection 36. Interconnection 36 may comprise a direct connection or a connection through a network such as the public service telephone network or an internet connection.

CPU 16 is programmed with the appropriate data analysis software for the present invention. The CPU 16 generates various screen displays and the like for quick and easy analysis of the data.

Figure 2:
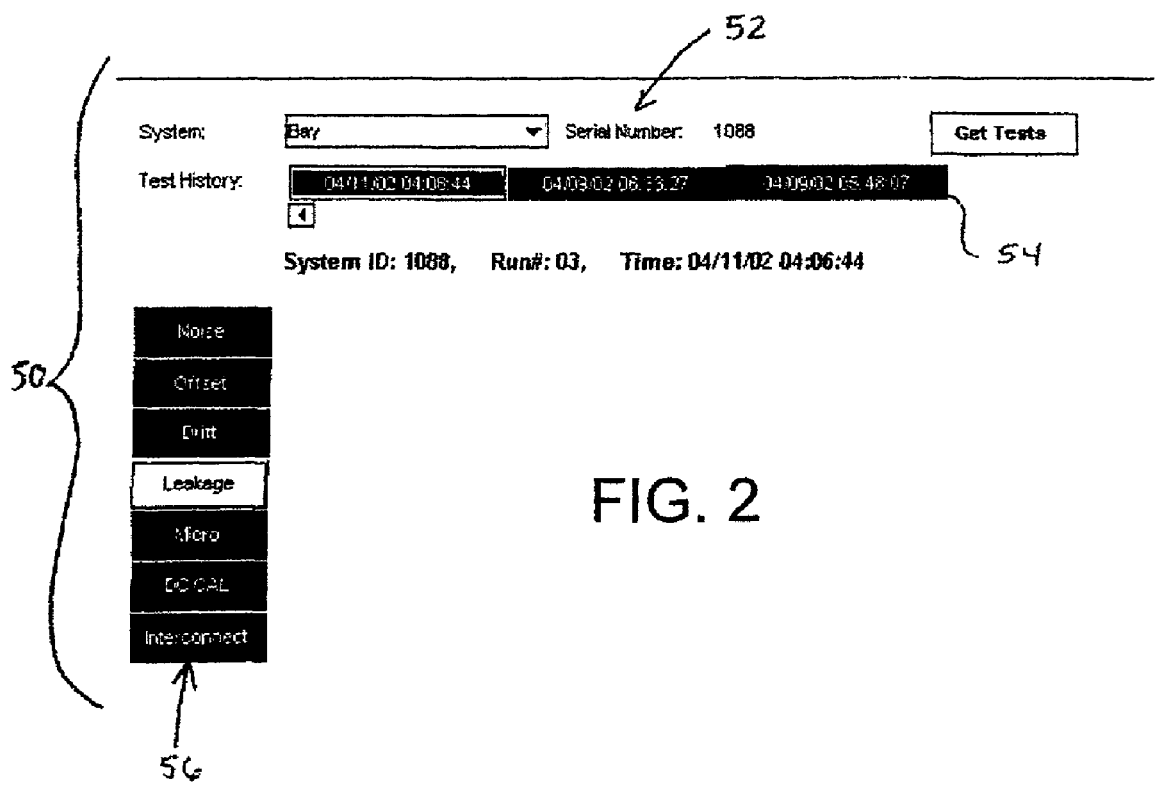
FIG. 2 is a screen layout of a test history screen according to the present invention.

Referring now to FIG. 2, a first screen 50 is illustrated. The first screen 50 is displayed after a connection of computer controller 14 and CT system 12 as formed through interconnection 36. Identification indicia 52 may be displayed to illustrate the particularly serial number, model number or other identification of the data acquisition system or the CT system. Test history indicia 54 may also be displayed on first screen 50. Test history 54 may include the date and time of the previous test. These tests may be stored within CT system 12 or may be stored in memory 18. Various test portions may also be displayed by test portion indicia 56. Test portion indicia 56 may allow the operator to obtain the data from various types of tests to display them on the screen. The various tests may be determined based upon the type of machine and the various critical to quality characteristics associated with such a system. The test portion indicia 56 may be colored to indicate pass or fail. When the operator clicks on each one of these devices they may also provide an indication as to the pass fail for the various parts of each of these tests.

Figure 3:
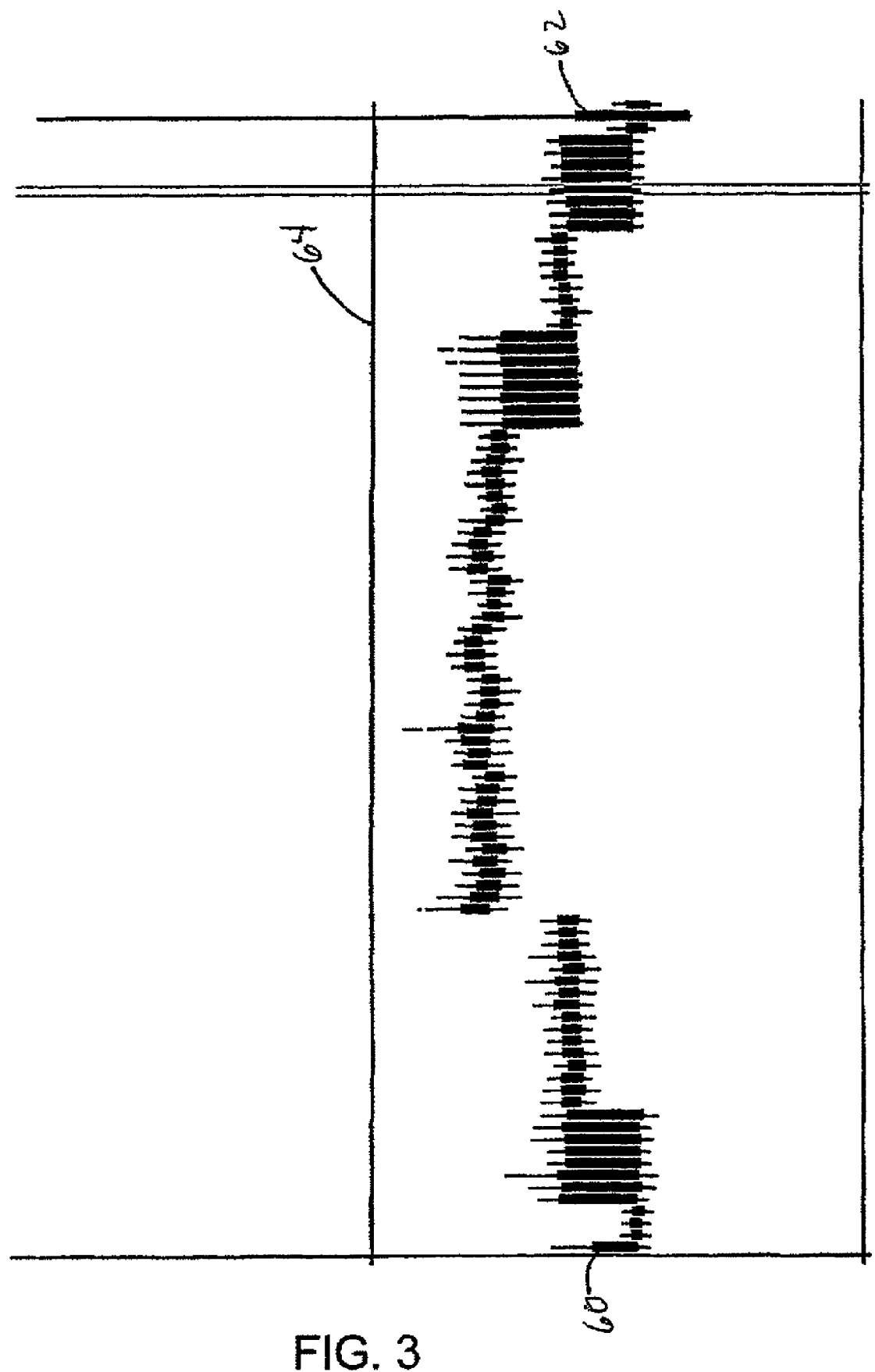
FIG. 3 is a data mapping screen according to the present invention.
Figure 4:
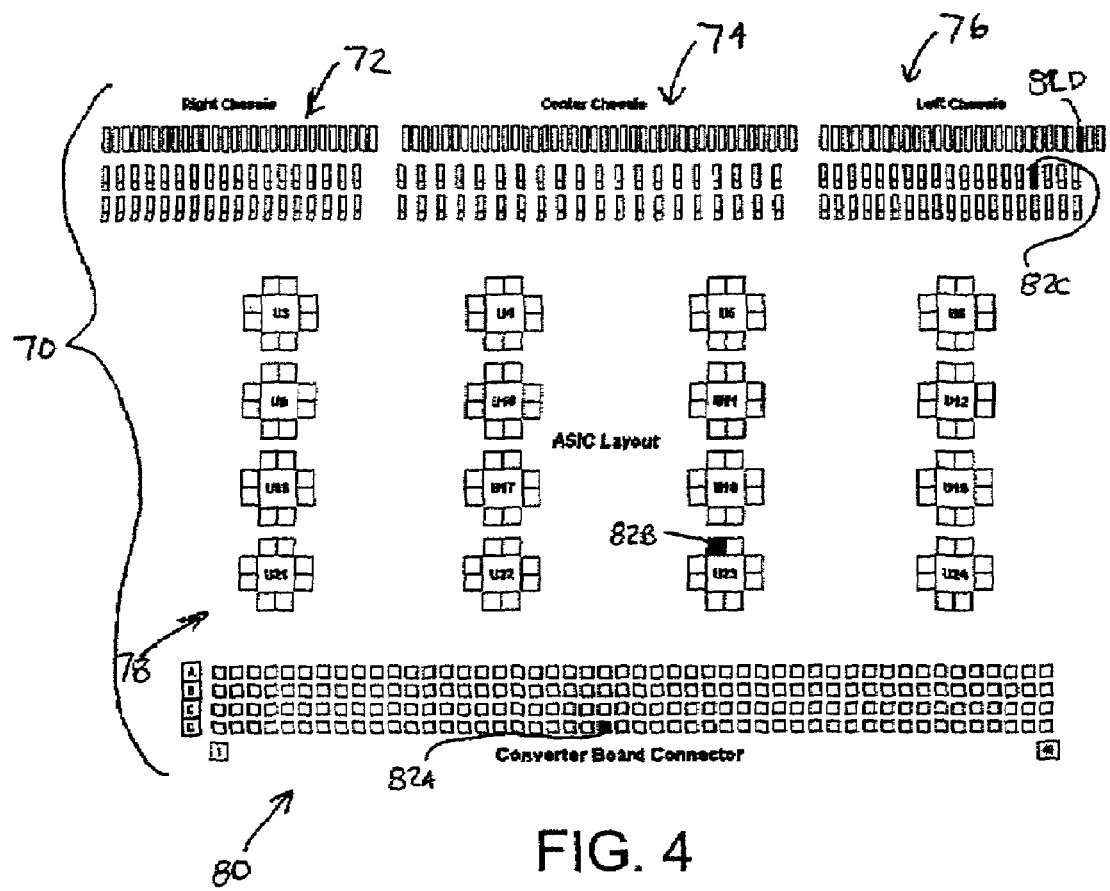
FIG. 4 is a screen layout having screen indicia corresponding to a schematic representation of the data acquisition system.

Referring now to FIG. 3, a box plot illustrating the various tests may be illustrated. Each converter within the data acquisition may be represented by one of the box plots 60. The box plot points are raw data that has been normalized (dividing by the upper specification limit). This allows easier comparison with the various box plots. It should be noted that the upper specification limit may not be the same for all channels of the converters. The box plot 60 may be colored to indicate pass or fail. For example, the failed box plots may be indicated in red while the green is used to indicate pass. Various other indications may be provided on the screen. For example, box 52 may indicate trouble since the range of data extends above the box plot 62 above a fail line 64. The worst case converter may also be identified on the screen display (a so-called quality indicator). If the quality indicator is above one, the test failed which means the worst value is above the upper specification limit.

Another screen 70 is illustrated. In this screen a schematic layout of the data acquisition system is illustrated. The data acquisition system has a right chassis portion 72, a center chassis portion 74, and a left chassis portion 76. These portions correspond to specific circuits. The schematic representation also has an application-specific integrated circuit (ASIC) layout 78.

A converter board to connect indicia 80 is also illustrated. Each of the portions 72 through 80 have various boxes therein corresponding on a one-to-one basis with the circuit board in the data acquisition system. Box 82A, 82B, 82C, and 82D correspond to errors found in the critical to quality characteristics. Thus, these components can easily be replaced by merely looking at the schematic representation thereof.

As can be seen, the present invention allows a technician or an assembly person to easily locate and identify the problem in a data acquisition circuit or other complicated circuit without the need to interpret a vast amount of data.

It is inherent in any system that various security procedures and the like may be provided by the systems described herein such as password and user identification.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

The invention claimed is:

1. A system comprising:
   a diagnostic system;
   a data acquisition system coupled to the diagnostic system;
   a computer controller coupled to the data acquisition system;
   a display device coupled to the computer controller;
   said controller receiving data from said data acquisition system, diagnosing a problem in response to said data, said controller generating a first screen display corresponding to a schematic representation of the data acquisition system, said controller generating a screen indicia on said display device corresponding to a location of a problem on the schematic representation to the data acquisition system, said controller generating a second screen display comprising a boxplot illustrating normalized raw data corresponding to the schematic representation.

2. A system as recited in claim 1 further comprising a computed tomography system, the data acquisition system is disposed with the computed tomography system.

3. A system as recited in claim 2 wherein the computed tomography system comprises a detector assembly, said data acquisition system disposed within said detector assembly.

4. A computed tomography system comprising a system as recited in claim 1.

5. A system as recited in claim 1 wherein said data is stored in a memory.

6. A system as recited in claim 1 wherein said data is communicated from said data acquisition system.

7. A system as recited in claim 1 wherein said data acquisition system is located remotely from said diagnostic system.

8. A system as recited in claim 1 further comprising a network coupling said computer controller and said data acquisition system.

9. A system as recited in claim 1 wherein said controller has a web browser, said controller generating the screen indicia through said web browser.

10. A system as recited in claim 1 wherein the boxplot is colored to indicate passed or failed data.

11. A diagnostic system for a data acquisition system comprising:
    a computer controller coupled to the data acquisition system; and
    a display device coupled to the computer controller;
    said controller receiving data from said data acquisition system, diagnosing a problem in response to said data, said controller generating a first screen display corresponding to a schematic representation of the date acquisition system, said controller generating a screen indicia on said display device corresponding to a location of a problem on the schematic representation of the data acquisition system, said controller generating a second screen display comprising a boxplot illustrating normalized raw data corresponding to the schematic representation.

12. A diagnostic system as recited in claim 11 further comprising a network coupling said computer controller and said data acquisition system.

13. A diagnostic system as recited in claim 12 wherein said network comprises a public service telephone network.

14. A diagnostic system as recited in claim 12 wherein said network comprises the Internet.

15. A diagnostic system as recited in claim 11 wherein said data is stored in a memory.

16. A diagnostic system as recited in claim 11 wherein said controller has a web browser, said controller generating the screen indicia through said web browser.

17. A diagnostic system as recited in claim 11 wherein said data is communicated from said data acquisition system.

18. A diagnostic system as recited in claim 11 wherein the boxplot is colored to indicate passed or failed data.

19. A method for operating a diagnostic system comprising:
    receiving data from a data acquisition system;
    diagnosing a problem in response to said data;
    generating a first screen display corresponding to a schematic representation of the data acquisition system;
    generating a screen indicator on said display device corresponding to a location of a problem on the schematic representation of the data acquisition system; and
    generating a second screen display comprising a boxplot illustrating normalized raw data corresponding to the schematic representation.

20. A method as recited in claim 19 wherein receiving data comprises receiving data through an interface.

21. A method as recited in claim 19 wherein receiving data comprises remotely receiving data.

22. A method as recited in claim 19 wherein said data acquisition system is disposed within a CT system.

23. A method as recited in claim 19 further comprising coloring the boxplot is colored to indicate passed or failed data.

* * * * *